United States Patent
Cellis et al.

(10) Patent No.: US 6,557,014 B1
(45) Date of Patent: Apr. 29, 2003

(54) METHOD AND APPARATUS FOR RECORD ADDRESSING IN PARTITIONED FILES

(75) Inventors: Pedro Cellis, Austin, TX (US); Michael Heytens, Austin, TX (US); Mark Melton, Round Rock, TX (US)

(73) Assignee: Compaq Computer Corporation, Cupertino, CA (US)

( * ) Notice: Subject to any disclaimer, the term of this patent is extended or adjusted under 35 U.S.C. 154(b) by 0 days.

(21) Appl. No.: 10/061,403

(22) Filed: Feb. 1, 2002

Related U.S. Application Data

(62) Division of application No. 09/162,256, filed on Sep. 28, 1998, now Pat. No. 6,473,774.

(51) Int. Cl.$^7$ .............................................. G06F 17/30
(52) U.S. Cl. ......................... 707/205; 707/200; 707/1
(58) Field of Search ............................. 707/1, 2, 3, 200, 707/205

(56) References Cited

U.S. PATENT DOCUMENTS

| | | | |
|---|---|---|---|
| 5,710,915 A | 1/1998 | McElhiney | 707/3 |
| 5,768,532 A * | 6/1998 | Megerian | 709/245 |
| 5,802,357 A * | 9/1998 | Li et al. | 707/2 |
| 5,832,479 A | 11/1998 | Berkowitz | 707/3 |
| 5,893,086 A | 4/1999 | Schmuck et al. | 707/1 |
| 5,950,199 A | 9/1999 | Schmuck et al. | 707/8 |
| 5,960,431 A | 9/1999 | Choy | 707/7 |
| 5,978,795 A * | 11/1999 | Poutanen et al. | 707/3 |
| 5,983,215 A | 11/1999 | Ross et al. | 707/2 |
| 6,002,866 A * | 12/1999 | Fuller | 707/205 |
| 6,055,526 A | 4/2000 | Ambroziak | 707/2 |

OTHER PUBLICATIONS

Varman et al., An Efficient Multiprocessor Merge Algorithm, Databases, Parallel Architectures and their Applications PARBASE–90 (IEEE), p. 276–283, Mar. 1990.*

* cited by examiner

Primary Examiner—Greta Robinson
(74) Attorney, Agent, or Firm—Fenwick & West LLP

(57) ABSTRACT

A method and apparatus introduces the creation and use of two record addressing functions. One function "computeRID" assigns identifiers to records, and the other function "lookupRID" performs the related task of locating a record given its identifier.

3 Claims, 12 Drawing Sheets

| Mapping Function Call 300 | Id (input) 302 | PartNum (output) 304 | Offset (output) 306 | 308 |
|---|---|---|---|---|
| 310 | 312 | 314 | 316 | |
| lookupRID(1,2) | 1 | 1 | 1 | |
| lookupRID(2,2) | 2 | 2 | 1 | |
| lookupRID(3,2) | 3 | 1 | 2 | |
| lookupRID(4,2) | 4 | 2 | 2 | |
| lookupRID(5,2) | 5 | 1 | 3 | |
| lookupRID(6,2) | 6 | 2 | 3 | |
| ... | ... | ... | ... | |

Identifier Mapping for File With Two Partitions.

FIG. 3A

| Mapping Function Call | ID (input) | PartNum (output) | Offset (output) |
|---|---|---|---|
| lookupRID(1,3) | 1 | 1 | 1 |
| lookupRID(2,3) | 2 | 2 | 1 |
| lookupRID(3,3) | 3 | 1 | 2 |
| lookupRID(4,3) | 4 | 2 | 2 |
| lookupRID(5,3) | 5 | 3 | 1 |
| lookupRID(6,3) | 6 | 3 | 2 |
| ... | ... | ... | ... |

Identifier Mapping for File With Three Partitions.

FIG. 4A 510  514

| P1 | P2 | P3 | P4 |
|----|----|----|----|
| 1  | 2  | 5  | 9  |
| 3  | 4  | 6  | 10 |
| 7  | 8  | 11 | 12 |
| 13 | 14 | 17 | 21 |
| 15 | 16 | 18 | 22 |
| 19 | 20 | 23 | 24 |
| 25 |    |    |    |

512 points to the "1" in P1.

Identifier Map For a File With Four Partitions

| P1 | P2 | P3 | P4 | P5 |
|----|----|----|----|----|
| 1  | 2  | 5  | 9  | 15 |
| 3  | 4  | 6  | 10 | 16 |
| 7  | 8  | 11 | 12 | 18 |
| 13 | 14 | 17 | 21 | 22 |
| 19 | 20 | 23 | 24 |    |
| 25 |    |    |    |    |

Identifier Map For the same File With Five Partitions

FIG. 5C

METHOD AND APPARATUS FOR RECORD ADDRESSING IN PARTITIONED FILES

This application is a divisional of U.S. application Ser. No. 09/162,256, filed on Sep. 28, 1998, now U.S. Pat. No. 6,473,774 titled "Method and apparatus for record addressing in partitioned files", which is herein incorporated by reference in its entirety.

BACKGROUND OF THE INVENTION

Record identifiers are used extensively within a database system to represent various kinds of links or references between records. For example, a record describing a banking transaction may contain a reference to the record of the customer who initiated the transaction, the record of the branch that handled the transaction, or other records. The references are typically implemented by storing the referenced record's identifier in the referencing record.

In practice, many different types of identifiers are used to implement references. While some identifiers offer flexibility, others offer efficiency. For example, "logical identifiers" do not provide information about the actual physical location of a record in memory. Thus, logical identifiers require an additional and costly lookup to locate a record. Although inefficient, logical identifiers offer significant flexibility, since relocating records may be provided simply by updating the structure (e.g., B-tree or hash table) that maps identifiers to actual physical locations.

In contrast, identifiers that provide physical address information, such as actual disk addresses, are extremely efficient but lack flexibility. For example, physical address identifiers do not facilitate the movement of records and therefore do not accommodate file growth.

A partitioned or distributed environment such as a database or file adds a level of complexity that presents additional efficiency and flexibility challenges in assigning and looking up record identifiers. For example, providing an efficient lookup in a partitioned file is particularly challenging since an extra level of identifier translation may be required to determine the partition containing a record. Furthermore, there are greater flexibility requirements since there are more ways to reorganize a partitioned file in response to adding, dropping, or merging partitions.

Conventional methods, such as hashing and range methods, perform record addressing and data access in partitioned files. Generally, with hashing, an index into a hash table is created by applying a formula to each data record to produce a numeric identifier, generally referred to as a hash key or index key. A hash key is used to index into a table to find all records associated with the key. However, an additional method must be used to locate the desired record among the records that possess the same hash key. For example, a customer number could be used to identify the desired records among a set of records with a specified hash value.

Although highly flexible in accessing data, hashing is inefficient if there is a change in the number of file partitions. More specifically, to re-index the file it may be necessary to perform the costly and inefficient process of re-computing the hash value of each data record. Furthermore, re-computing each value is likely to move data records between partitions unnecessarily. When the number of partitions changes, it is costly to remap records to partitions while maintaining balanced partitioning where the records are distributed evenly between the partitions. Accordingly, hashing provides an inefficient and costly method for indexing and accessing data if the number of partitions of the file may change.

If a file is partitioned and the number of partitions changes, the range method of indexing and accessing data is similarly inefficient. Generally, with ranges, marks are set that assign contiguous values among partitions of a file. For example, if there are two partitions, all values having a first character within the alphanumeric range of "a–m" may be assigned to partition 1, and all values having a first character within the alphanumeric range of "n–z" may be assigned to partition 2. If a third partition is added, and there is a requirement to assign equal ranges among the partitions, each partition's range will change. For example, partition 1 will acquire values of "a–i", partition 2 will acquire values of "j–r", and partition 3 will acquire values of "s–y". Since the range changes affect each partition, it is likely that at least one half of the data records will move between partitions. Therefore, like hashing, the range method for indexing and accessing data is not efficient if files are partitioned and the number of partitions changes.

Thus, there is a need for a method of assigning identifiers to records and of subsequently locating a record given its identifier that provides a high level of flexibility and efficiency where the identifiers are applied to collections of uniformly structured records partitioned across multiple disks.

SUMMARY OF THE INVENTION

The described embodiment of the present invention introduces the creation and use of two record-addressing functions. One function "computeRID" assigns identifiers to records, while the other function "lookupRID" performs the related task of locating a record given its identifier. Although the functions are highly flexible and efficient and may be applied to all types of database structures, the functions are preferably applied to environments having file organizations in which the files are collections of uniformly structured records that are partitioned across multiple disks. Example file organizations include a one-dimensional array of records such as Relative files by Tandem Computers, a division of Compaq, of Cupertino, Calif., a key sequence such as a B-tree, and a hash file table. The functions may also be applied to various types of partitioning methods. For example, the functions may be applied when records are assigned to a partition using either a round-robin method or hashing.

The two record addressing functions of the present invention possess the properties of efficient record lookup, easy map maintenance, and flexible record addressing. The functions provide efficient lookup with a straightforward approach that does not include physical identifiers. The complexity of the functions is on the order of n operations, where n is the number of partitions. Therefore the functions iterate once for each partition. Furthermore, the mapping is independent of the number of records actually in the file.

The addressing functions of the present invention promote easy map maintenance since each function may be applied to any type of file. There is no file-specific state to maintain such as a search structure that maps ranges of identifiers to partitions. Furthermore, a file may evolve over time, where the number of partitions grows and shrinks. The mapping changes automatically as the number of partitions grows and shrinks, thereby relieving a user of the burden of specifying how the mapping changes (e.g., range).

The addressing functions promote flexible record addressing, particularly when increasing or deleting the number of partitions in a file. For example, when a table with n partitions is grown to n+1 partitions, only every nth record from the original n partitions is remapped to the new partition. No other records need to be remapped from one of the original n partitions to another.

The properties described above tend to produce balanced partitions, or files in which records are spread uniformly over partitions. Furthermore, the addition or deletion of a partition is efficient, since only 1/n of the records must be moved to a new partition. Also, the user is not burdened with the task of determining which identifier range to map to a new partition to achieve balanced partitions, since the function performs this task automatically.

In accordance with the purpose of the invention, as embodied and broadly described herein, the invention relates to a method for assigning identifiers to records, by a data processing system having a memory, comprising the steps of: receiving a partition number, an offset and a total number of partitions; repeatedly looping a number of times equal to the total number of partitions—1; the loop including: if the partition number is equal to a current loop value, determining a new partition number and performing a first offset compression to yield a new offset, and if the partition number is greater or less than the current loop value, performing a second offset compression to yield a new offset; and returning the offset as an identifier.

Furthermore in accordance with the purpose of the invention, as embodied and broadly described herein, the invention relates to a method for looking up a location of a record, by a data processing system having a memory, comprising the steps of: receiving an identifier and a total number of partitions; setting a partition number and an offset to values for a one partition file and setting a loop value to two; repeatedly, while loop value is less than or equal to the total number of partitions, selectively setting a new partition and performing a first offset compression whenever the offset is evenly divisible by the loop value and selectively performing a second offset compression whenever the offset divided by the loop value results in a remainder; and returning the partition number and the offset.

BRIEF DESCRIPTION OF THE DRAWINGS

The accompanying drawings, that are incorporated in and constitute a part of this specification, illustrate several embodiments of the invention and, together with the description, serve to explain the principles of the invention.

FIG. 4A is a table showing identifier mapping with function "lookupRID" for a file with three partitions.

FIG. 5B shows an identifier map of a file with four partitions.

FIG. 5C shows the identifier map of FIG. 5A with the addition of a fifth partition.

DETAILED DESCRIPTION OF THE PREFERRED EMBODIMENTS

Reference will now be made in detail to preferred embodiments of the invention, examples of which are illustrated in the accompanying drawings. Wherever possible, the same reference numbers will be used throughout the drawings to refer to the same or like parts.

Figure 1:
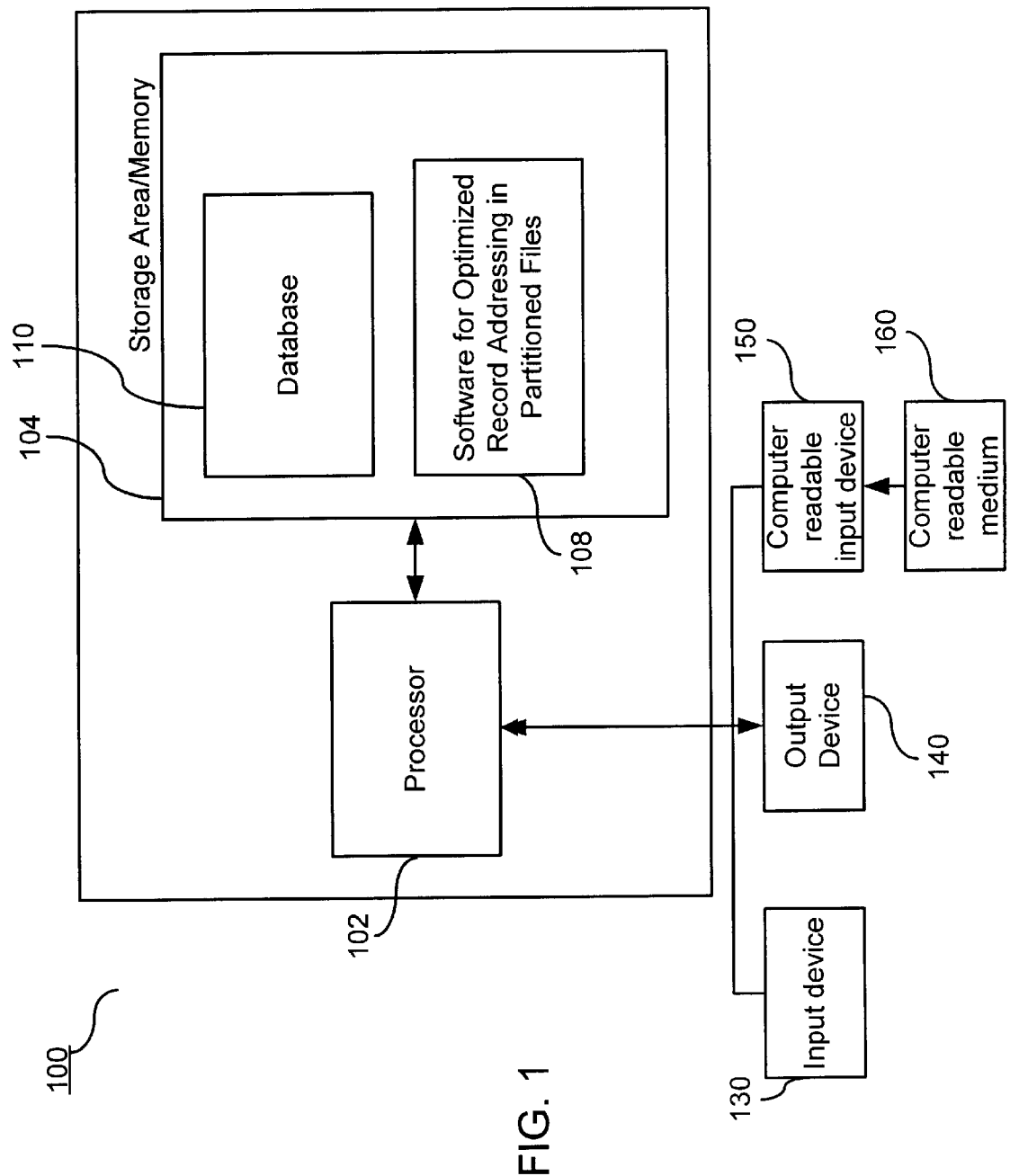
FIG. 1 is a block diagram of a data processing system in accordance with a preferred embodiment of the present invention.

FIG. 1 is a block diagram of a data processing system 100 in accordance with a preferred embodiment of the present invention. In FIG. 1, data processing system 100 includes a processor 102 and a storage area (such as a memory) 104. Storage area 104 includes a database 110, with partitions, and software 108 for optimized record addressing in partitioned files. One of ordinary skill in the art will understand that partitioned database 110 typically resides on disk as well as in memory 104.

In the present invention, record addressing software 108 may operate upon a relational database system such as Tandem Nonstop SQL/MX relational database system, available from Tandem Computers, Inc., a division of Compaq Computers, Inc., of Cupertino, Calif., the Oracle relational database systems available from Oracle Computers of Redwood City, Calif., and DB2 relational database system available from IBM Corp. of Armonk, N.Y. As will be understood by a person of ordinary skill in the art, these relational databases are provided as examples and that other types of databases may be suitable for application of the present invention. A person of ordinary skill in the database art will further understand that two functions performed by optimized record addressing software 108 determine either the partition and offset or the identifier of one or more values in a relational database.

System 100 includes an input device 130, such as a keyboard, a touchpad, or a mouse that receives input from a user. System 100 also includes an output device 140, such as a display screen, a printer, etc. that outputs information to the user.

A person of ordinary skill in the art will understand that system 100 may also contain additional information, such as input/output lines; input devices, such as a keyboard, a mouse, or a voice input device; or display devices, such as a display terminal. System 100 may also may include application programs, operating systems, data, etc., which are not shown in the figure for the sake of clarity. It also will be understood that system 100 can also include numerous elements not shown, such as disk drives, keyboards, display devices, network connections, additional memory, additional CPUs, LANs, input/output lines, etc.

Specifically, if the described embodiment of the present invention is performed for several partitions of a database table, as described below, computer system 100 may include multiple processors 102 each executing in parallel the method of the present invention. Alternately, if a method in accordance with the described embodiment of the present invention is performed for several partitions of a database table, computer system 100 may include multiple computer systems communicating over a network (or having some appropriate distributed organization), where each of the multiple computer systems has one or more processors.

In the following discussion, it will be understood that the steps of methods and flow charts discussed preferably are performed by processor 102 (or other appropriate processor (s)) executing instructions stored in storage area 104 (or other appropriate memories). Specifically, the instructions are a part of the record addressing software 108. It will also be understood that the invention is not limited to any particular implementation or programming technique and that the invention may be implemented using any appropriate techniques for implementing the functionality described herein. The invention is not limited to any particular programming language or operating system.

System 100 can also include a computer-readable medium input device 150, which reads a computer-readable medium 160. The term "computer-readable medium" as used herein refers to any medium that participates in providing instructions to a processor for execution. Such a medium may take many forms, including but not limited to, non-volatile media, volatile media, and transmission media. Non-volatile media includes, for example, optical or magnetic disks, such as a storage device. Volatile media includes dynamic memory. Transmission media include coaxial cables, copper wire, and fiber optics, including the wires that comprise a bus within a computer. Transmission media can also take the form of acoustic or light waves, such as those generated during radio-wave and infra-red data communications.

Common forms of computer-readable media include, for example, a floppy disk, a flexible disk, or a hard disk; magnetic tape or any other magnetic medium; a CD-ROM or any other optical medium; punchcards, papertapes, or any other physical medium with patterns of holes; a RAM, a PROM, an EPROM, a FLASH-EPROM, or any other memory chip or cartridge; a carrier wave as described hereafter; or any other medium from which a computer can read.

Various forms of computer-readable media may be involved in carrying one or more sequences of one or more instructions to a processor for execution. For example, the instructions of record addressing software 108 may initially be carried on a magnetic disk or a tape. The instructions are loaded into memory 104. Alternately, instructions can be sent over a telephone line using a modem. A modem local to the computer system can receive the data on the telephone line and use an infra-red transmitter to convert the data to an infra-red signal. An infra-red detector coupled to a bus can receive the data carried in the infra-red signal and place the data on the bus. The bus carries data to main memory, from which a processor retrieves and executes the instructions. The instructions received by main memory may optionally be stored on a storage device either before or after execution by a processor.

Some or all of the instructions and data structures in memory 104 may be read into memory from computer-readable medium 160. Execution of sequences of instructions contained in main memory causes one or more processors to perform the process steps described herein. In alternative embodiments, hard-wired circuitry may be used in place of or in combination with software instructions to implement the invention. Thus, preferred embodiments of the invention are not limited to any specific combination of hardware circuitry and software.

Figure 2:
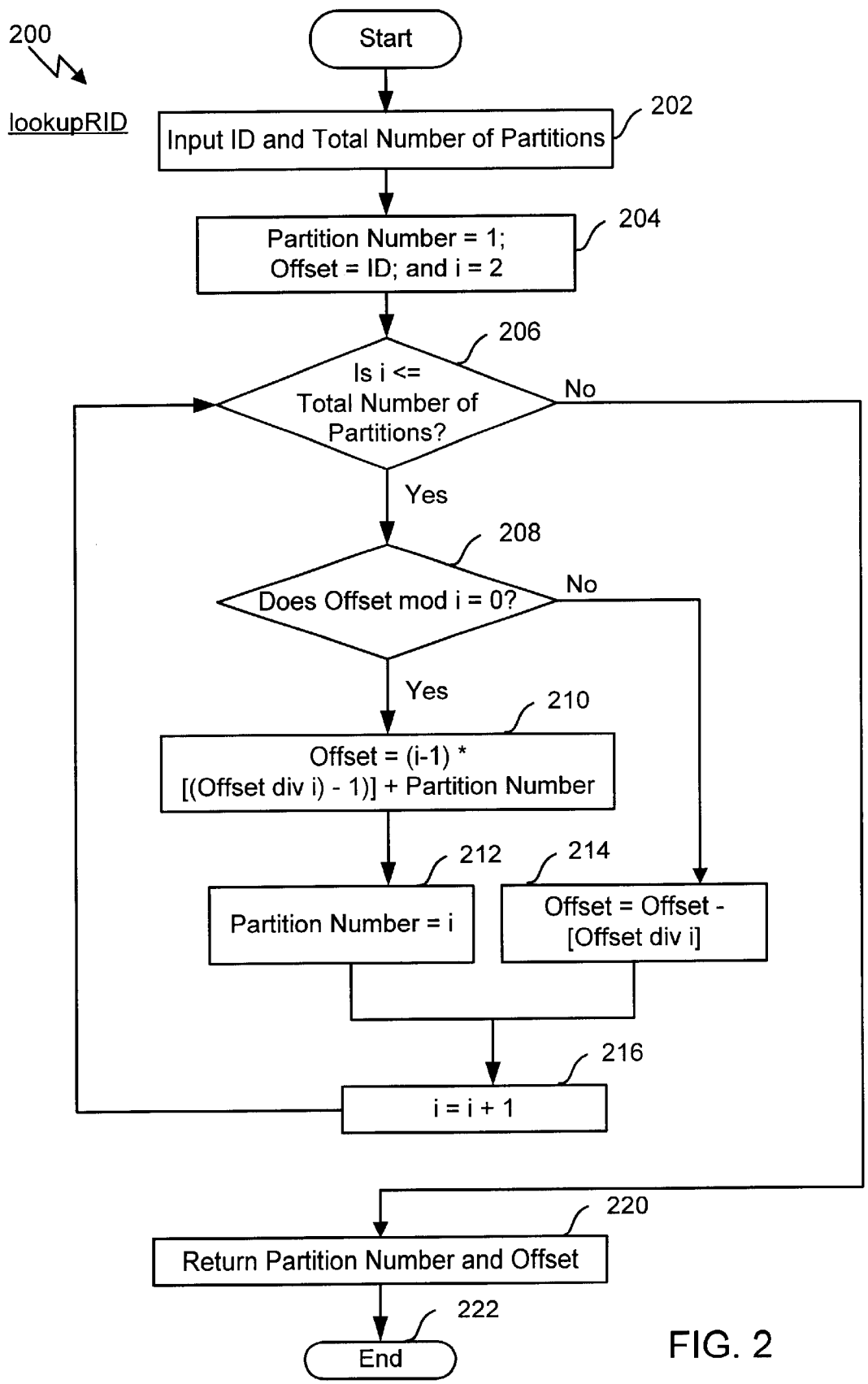
FIG. 2 is a flowchart showing a method of determining, by executing function "lookupRID", the partition number and offset of a record given the identifier and total number of partitions, in accordance with the system of FIG. 1.

FIG. 2 is a flowchart showing a method 200 of determining, by executing function "lookupRID", the partition number and offset of a record given the identifier and total number of partitions, in accordance with the system of FIG. 1. As shown, the function "lookupRID" begins in step 202 with the input of the record identifier and the total number of partitions. In step 204, the partition number is initialized to 1, the offset is initialized to the record identifier and the variable "i" is initialized to 2. Step 204 initializes variables to the values they would have if there were only one partition. Hence, if there is only one partition, offset acquires the value of the identifier.

If the total number of partitions is greater than "1", then steps 206 to 216 (representing a "for-next" loop) are executed once for partitions 2 through the last partition. Therefore, if there are two partitions, then the body of the loop is executed once with "i" set to "2."

More particularly, in step 206, it is determined whether "i" is less than or equal to the total number of partitions. If "i" is not less than or equal to the total number of partitions, so that all of the partitions have been processed, step 220 returns the partition number and offset of the record being looked up. If "i" is less than or equal to the total number of partitions, then in step 208 it is determined whether offset modulo "i" is equal to zero. The effect of determining whether offset modulo "i" is equal to zero is that an equal number of identifiers maps to each partition to produce the most effective use of identifier space for individual partitions. If offset modulo "i" is not equal to zero then in step 214 offset acquires the value of offset minus the result of offset divided by "i". One of ordinary skill in the art will understand that the result of the division is automatically truncated to a whole number. If offset modulo "i" is equal to zero then in step 210 offset acquires the value of variable "i" minus 1 multiplied by the result of offset divided by "i" minus 1 and the addition of the partition number. In step 212, partition number receives the value of "i". In step 216, regardless of whether or not offset modulo "i" is equal to zero, "i" is incremented by one. After step 216, control returns to step 206 at the top of the for-next loop to determine whether "i" is less than or equal to the total number of partitions. If "i" is less than or equal to the total number of partitions then in step 220, return the partition number and offset. The for-next loop of steps 206 to 216 then ends.

FIG. 3A is a table showing identifier mapping with function "lookupRID" for a file of a sequential array of records with two partitions. As shown, the table includes the specific mapping function call 302 to lookupRID and the corresponding identifier input 304, the partition number output 306, and the offset output 308. Since in step 208 it is determined whether offset modulo "i" is equal to zero, an equal number of identifiers maps to each of the two partitions. Because "i" is initially two, the outcome of step 208 is true for all even identifiers and is false for all odd identifiers. Therefore for even identifiers, partition number is updated to 2 in step 212 and for odd identifiers it is not updated. The result is a table where identifiers 1, 3, and 5 map to partition 1 and identifiers 2, 4, and 6 map to partition 2.

A detailed explanation of the execution of function "lookupRID" with two inputs (the identifier equal to four and the total number of partitions equal to two) includes the following steps: In step 206, since variable "i" (which has been initialized to a value of 2) is equal to the total number of partitions, the method continues to step 208. In step 208, since offset is equal to 4 and "i" is equal to 2, the result of offset mod "i" equal to zero is true. Since the result of step 208 is true, perform step 210 to calculate the new offset of "2." In step 212, partition number acquires the value of "i" which is 2. In step 216, increment "i" by "1" to the value of 3. Hence, in the next test of step 206, the result of "i" less than or equal to the total number of partitions is false. A result of false causes processing to drop out of the loop of steps 206 to 216 and to proceed to step 220. Step 220 returns the values of partition number equal to 2 and offset equal to 2. The function of lookupRID then ends.

Figure 3B:
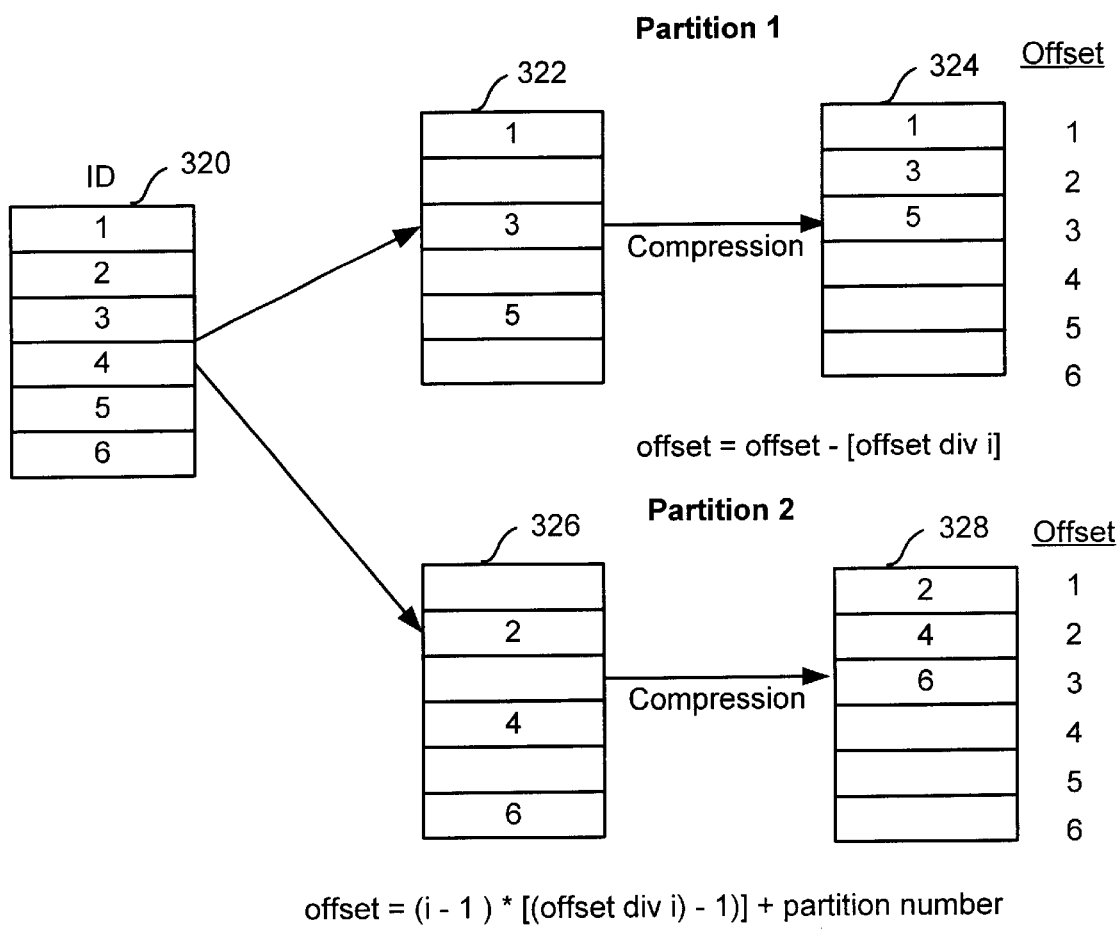
FIG. 3B shows an example of the mapping and the subsequent compression of a file with two partitions.

FIG. 3B shows an example of the mapping and subsequent compression of a file with two partitions that results from execution of the mapping function calls of FIG. 3A. As shown, in response to step 208, identifiers 320 map to partition 1 322 and partition 2 326. In step 208, offset modulo "i" equal to zero is false for identifiers that map to partition 1 322, and is true for identifiers that map to partition 2 326. Step 214 subsequently compresses the identifiers of partition 1 322 resulting in a compressed partition 1 324. Step 210 subsequently compresses the identifiers of partition 2 326 resulting in compressed partition 2 328.

FIG. 4A is a table showing identifier mapping with function "lookupRID" for a file with three partitions. As shown, the table includes the specific mapping function call 402 and the corresponding identifier input 404, the partition number output 406, and the offset output 408. As described above with two partitions, since step 208 determines whether offset modulo "i" is equal to zero, an equal number of identifiers map to each partition. Because the total number of partitions is 3, the loop from step 206 to step 216 (in comparison to a two partition file) executes an additional cycle with "i" set to 3. Therefore, provided that offsets are dense starting at 1, (i.e., 1, 2, 3, 4, etc.), offset modulo "i" equal to zero will hold true for one third of the identifiers.

A detailed explanation of the execution of function "lookupRID" where the input includes identifiers equal to one to six and a total number of partitions equal to three is as follows. As described above, FIGS. 3A and 3B show the mapping of the identifiers when the variable "i" is equal to two. As shown in FIG. 3B, the compression method of step 214 maps identifiers 1, 3, and 5 to offset positions 1, 2, and 3 of partition 1. Also shown, the compression method of step 210 maps identifiers 2, 4, and 6 to offset positions 1, 2, and 3 of partition 2. Therefore, when the variable "i" acquires the value of "3," step 208 will hold true for the identifier at every third offset position. Hence, step 212 moves identifiers 5 and 6 at offset position 3 of partitions 1 and 2 to partition 3. Step 210 compresses identifiers 5 and 6 to offset positions 1 and 2 of partition 3. The result of executing the function "lookupRID" for three partitions and six identifiers is shown in FIG. 4A.

Figure 4B:
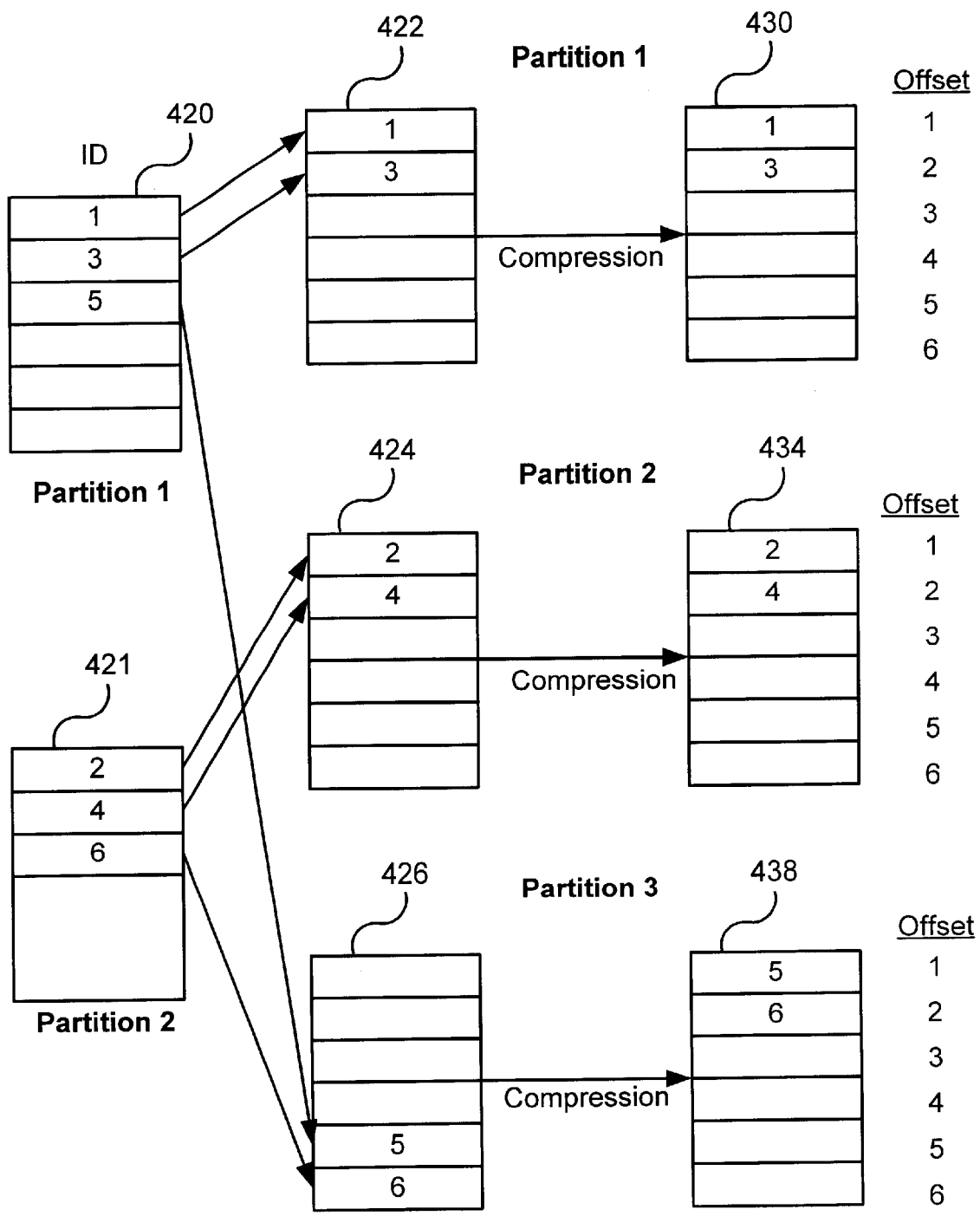
FIG. 4B shows an example of the mapping and subsequent compression of a file with three partitions.

FIG. 4B shows an example of mapping the two partition file output of FIG. 3B to a three partition file and the subsequent compression of the three partition file that results from. execution of the mapping function calls of FIG. 4A. As shown, in response to step 208, identifiers "1" and "3" of partition one 420 map to partition one 422, and identifier "5" of partition one 420 maps to partition three 426. Identifiers "2" and "4" of partition two 421 map to partition two 424 and identifier "6" of partition two 421 maps to partition three 426. The two compression methods of steps 210 and 214 result in the subsequent offset positions shown in partition one 430, partition two 434, and partition three 438.

Figure 5A:
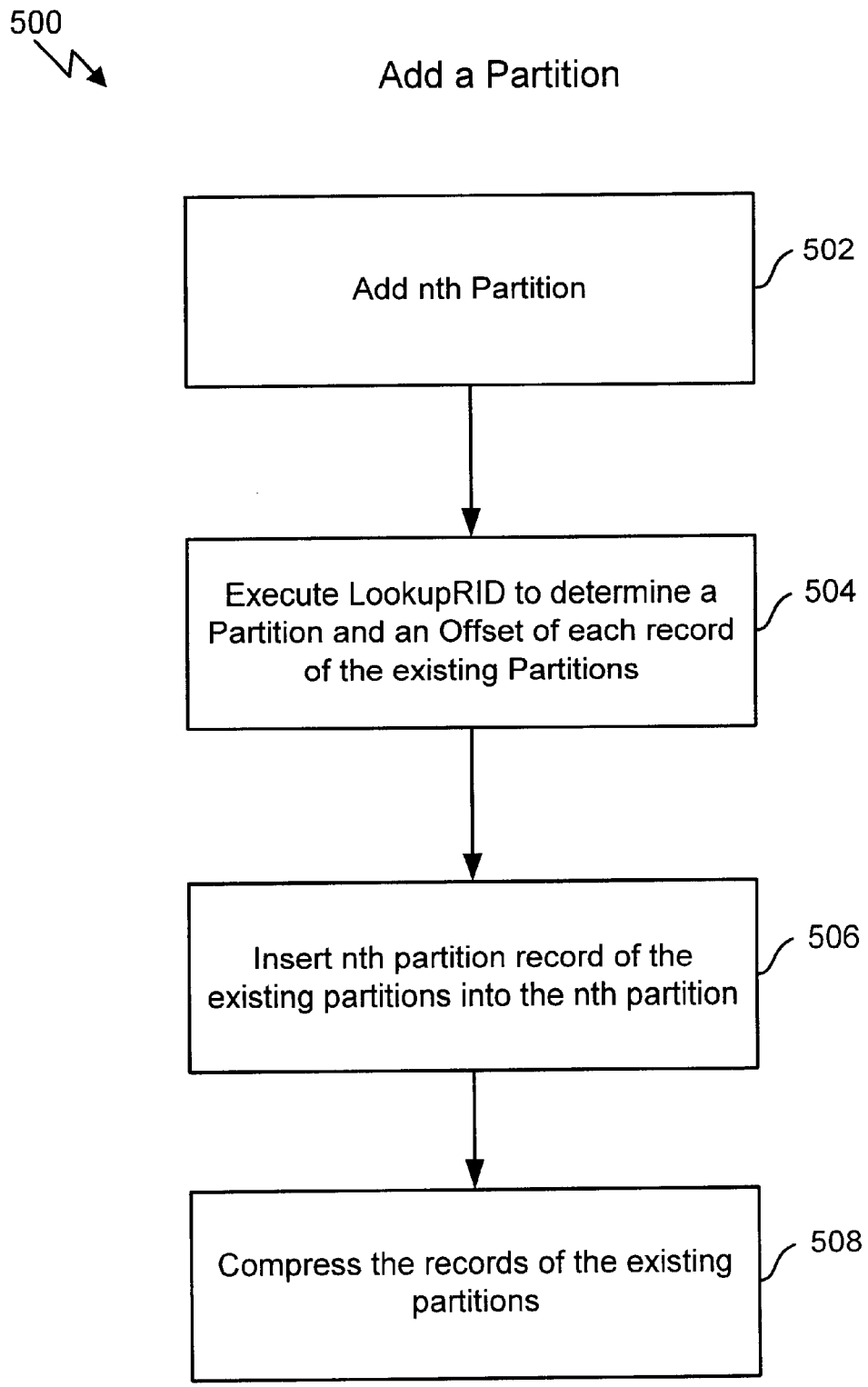
FIG. 5A is a flowchart showing a method of adding a partition to an existing partitioned file.

FIG. 5A is a flowchart showing a method 500 to add an nth partition to an existing partitioned file. In step 504, execute function "lookupRID" to determine a partition and offset of each record of the existing partitions. In step 506, move and insert a record to the nth partition if the execution of "lookupRID" for the given record indicated the nth partition. In step 508, compress the records of the existing partitions to eliminate the "holes" of the existing partitions that were a result of the movement of records from the existing partitions to the nth partition. FIGS. 5B and 5C show the addition of a partition to a partitioned file with a file format of a sequential array of records.

FIG. 5B shows an identifier map 510 of a file of a sequential array of records with four partitions. Each partition contains the records of identifiers as shown in the table. The identifiers are mapped to partitions according to function "lookupRID" of FIG. 2. For example, the execution of the function "lookupRID(1,4)" where the identifier is 1 512 and the total number of partitions is 4 maps identifier 1 to partition 1 and offset 1. Similarly, the execution of the function "lookupRID(2,4)" where the identifier is 2 514 and the total number of partitions is 4 maps identifier 2 to partition 2 and offset 1. Execution of function "lookupRID" for the other identifiers results in the partition and offset assignments as shown in FIG. 5B.

Therefore, one of ordinary skill in the art will understand that the limited movement of identifiers when adding or deleting a partition is a desirable property since such a methodology produces balanced partitions, where the records are spread uniformly over the partitions. Furthermore, such a methodology adds partitions efficiently, since only 1/n of the records must be moved to a new partition. In addition, the user is not burdened with the task of determining which identifier range for mapping to a new partition achieves balanced partitions. Instead, the record addressing method of the present invention automatically performs this task.

One of ordinary skill in the art will also understand that if the record addressing method of the present invention is used, dropping the last partition of a file is similarly efficient since it is simply the inverse of adding a new partition. More specifically, records from the partition to be dropped are distributed among the other partitions as determined by the mapping function of the present invention. It will be further appreciated that only records from the partition to be dropped are remapped.

Figure 6:
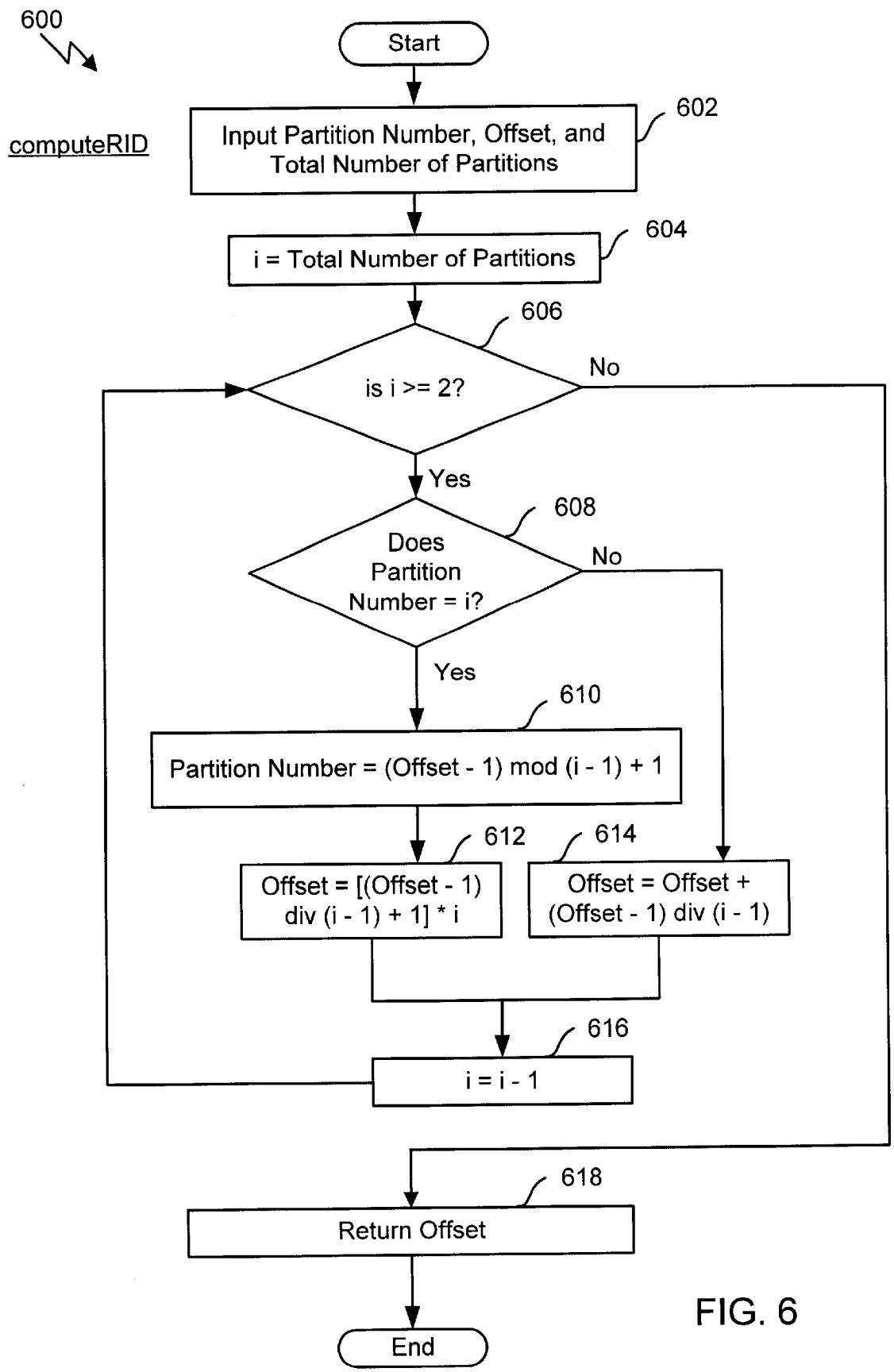
FIG. 6 is a flowchart showing a method of determining, by executing function "computeRID", the identifier of a record given the partition number, offset and total number of partitions, in accordance with the system of FIG. 1.

FIG. 6 is a flowchart showing a method of determining, by executing function "computeRID", the identifier of a record given the partition number, offset, and total number of partitions, in accordance with the system of FIG. 1. As shown, the function "computeRID" begins in step 602 with the input of the partition number, offset, and total number of partitions. In step 604, variable "i" is initialized to the total number of partitions.

If variable "i" is greater than or equal to 2 then the total number of partitions is greater than 1 and steps 606 to 616 representing a "for-next" loop are executed once for each partition from the last partition down to the second partition. For example, if there are two partitions, the body of the loop is executed once with "i" set to 2.

More particularly, step 606 determines whether variable "i" is greater than or equal to 2. If variable "i" is not greater than or equal to 2, indicating that record addressing of the partitions is complete, step 618 returns the offset, which may have been recomputed within the loop. One of ordinary skill in the art will understand that a return of the offset is a return of the identifier. If variable "i" is greater than or equal to 2, step 608 determines whether the partition number is equal to variable "i". Whether the partition number is equal to variable "i" determines which branch to take from step 608.

If the partition number is equal to variable "i", the partition number is recalculated in step 610 and the compression method of step 612 is applied. If partition number is not equal to variable "i" then the compression method of step 614 is applied. In step 616, regardless of whether or not partition number is equal to "i", decrement "i" by one. After step 616, return to step 606 at the top of the for-next loop to determine whether "i" is greater than or equal to 2. If "i" is less than or equal to 2 then in step 618 return the offset which is the identifier. The for-next loop of steps 606 to 616 then ends.

One of ordinary skill in the art will understand that the mappings performed by lookupRID and computeRID provide efficient lookup due to the minimal number of steps required to execute either function. This is in contrast to addressing schemes that use logical identifiers which require an expensive associated lookup such as a hash table, binary search tree, or similar structure.

The complexity of the record addressing of the present invention is on the order of n operations, where n is the number of partitions. Therefore, the record addressing function iterates once for each partition. It will further be appreciated that record addressing is independent of the number of records actually in a file. One of ordinary skill in the art will understand that since the record addressing is not dependent upon the number of records, the functions of this invention are particularly beneficial for performing record addressing in large relational databases.

One of ordinary skill in the art will also understand that the mappings resulting from the record addressing of the present invention are simple to maintain because the mappings are provided by methods that may be applied to any type of file. Unlike other conventional methods, there is no file specific state to maintain such as a search structure mapping ranges of identifiers to partitions. Also, a file may evolve over time; as the number of partitions grows and shrinks, the mapping of the present invention between existing partitions does not change. In contrast, conventional methods use mapping processes or tables that must be updated each time a file is reorganized.

Figure 7:
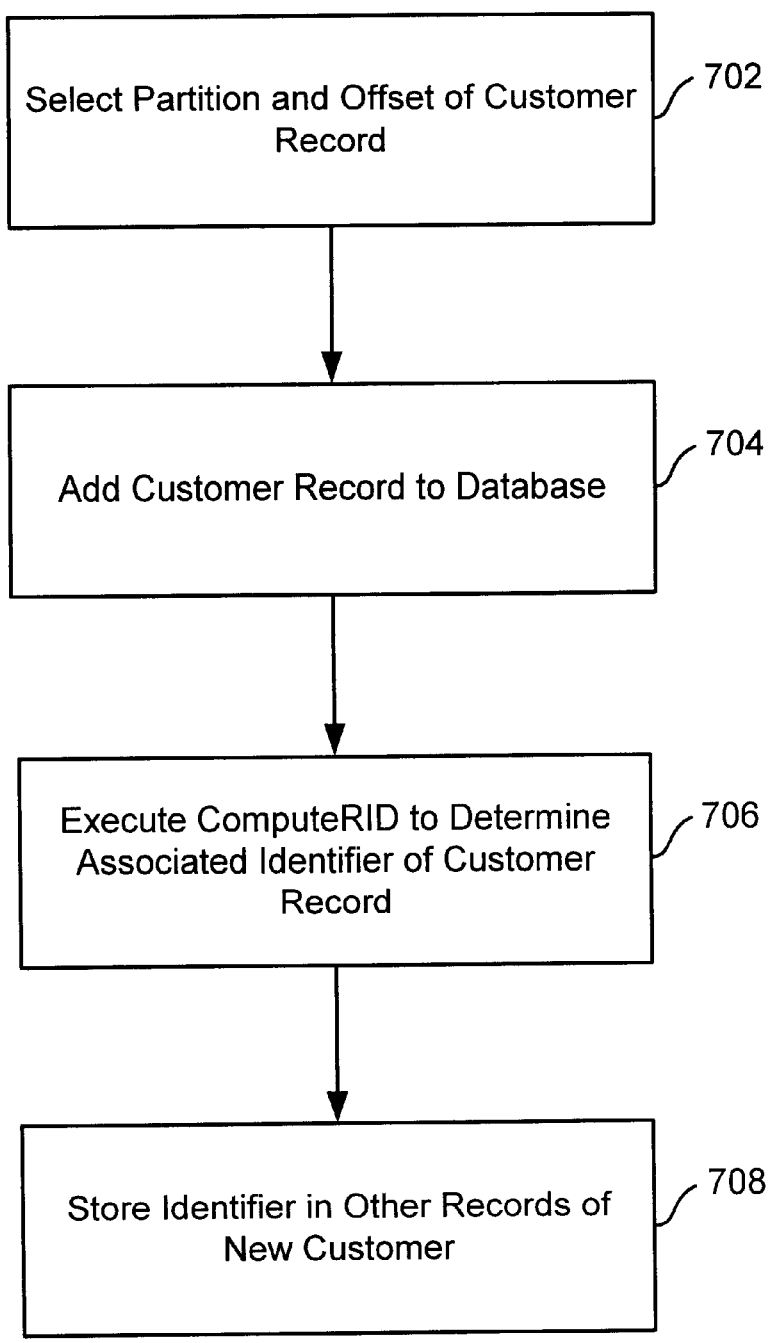
FIG. 7 is a flowchart showing an example of using the "computeRID" function.

The two mapping functions "lookupRID" and "computeRID" are used to respectively locate a record given its identifier and to assign unique identifiers to records. For example, FIG. 7 is a flowchart showing an example of using the "computeRID" function when a new customer is added to a database. The example begins in step 702 with the selection of the partition and offset for the customer record. In step 704, insert the new customer record into the database. In step 706, execute function "computeRID" to determine the associated identifier of the customer record. Once the identifier is known, in step 708, the identifier may be stored in other records associated with the new customer.

An application of the example in FIG. 7 could, for example, include adding a customer to a bank database. Once the identifier is determined, the identifier may be stored in other records that reference the new customer. For example, the identifier may be stored in a record associated with a deposit into the customer's account. One of ordinary skill in the art will understand the benefits of an efficient and flexible method of performing record addressing that determines identifiers.

Figure 8:
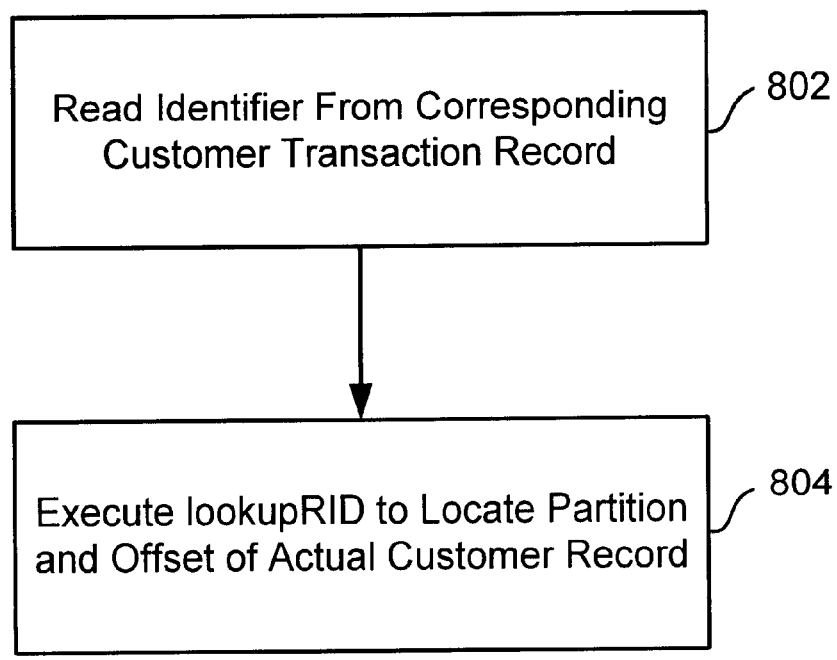
FIG. 8 is a flowchart showing an example of using the "lookupRID" function.

FIG. 8 is a flowchart showing an example of using the "lookupRID" function to locate an actual record. Hence, once "computeRID" is used to determine the identifier in FIG. 7, reports or queries in step 802 may locate the customer record associated with a particular transaction by reading the record identifier from a corresponding transaction record. Once the record identifier is read from the corresponding transaction record, in step 804, execute the function "lookupRID" to locate the partition and offset of the actual customer record.

The record addressing scheme of the present invention may be applied to the partitioning methods of round-robin partitioning and of hashing, and to the file storage organization of an array of fixed-length records, a hash table, and a B-tree (a tree-like structure).

In the case of round-robin horizontal partitioning and a file organization that is an array of fixed-length records, when the new row is inserted into a table or file, the partition where the row will be inserted is selected in a round-robin fashion. After a partition is selected, the new row is inserted into an available slot within the partition (e.g., sub-file of the selected partition). The execution of function "computeRID" with input of the record partition number, slot number (offset), and total number of partitions yields a unique identifier. The identifier may be stored in associated records to correspond to the new record. One of ordinary skill in the art will understand that the identifier of the new record need not be stored explicitly in the new record itself, since the identifier may be computed as needed.

In the case of round-robin horizontal partitioning and a file organization that is a hash table, when adding a new record, a partition is initially chosen in a round-robin fashion. An identifier is determined front the partition number, offset, and total number of partitions. Hashing is then performed upon the identifier and the identifier is entered into the hash table file within the selected partition.

One of ordinary skill in the art will understand that since a hash table does not include the concept of a fixed record offset or slot, an auxiliary structure may be necessary to record which slots or offsets have been used and which are available. An example of such a structure is a variable-length bit array, with a "1" in a particular bit position when the corresponding record slot is occupied, and a "0" when the corresponding slot is free. Hence, this structure would be used to determine in which slot a new record is to reside. An alternative method to maintaining an auxiliary structure is to randomly pick a slot when one is needed, and then to pick an alternative slot if the initial selected slot is already in use (e.g., the identifier associated with the partition and the slot is already in the hash table). Slots are randomly picked until a free slot is found.

Figure 9:
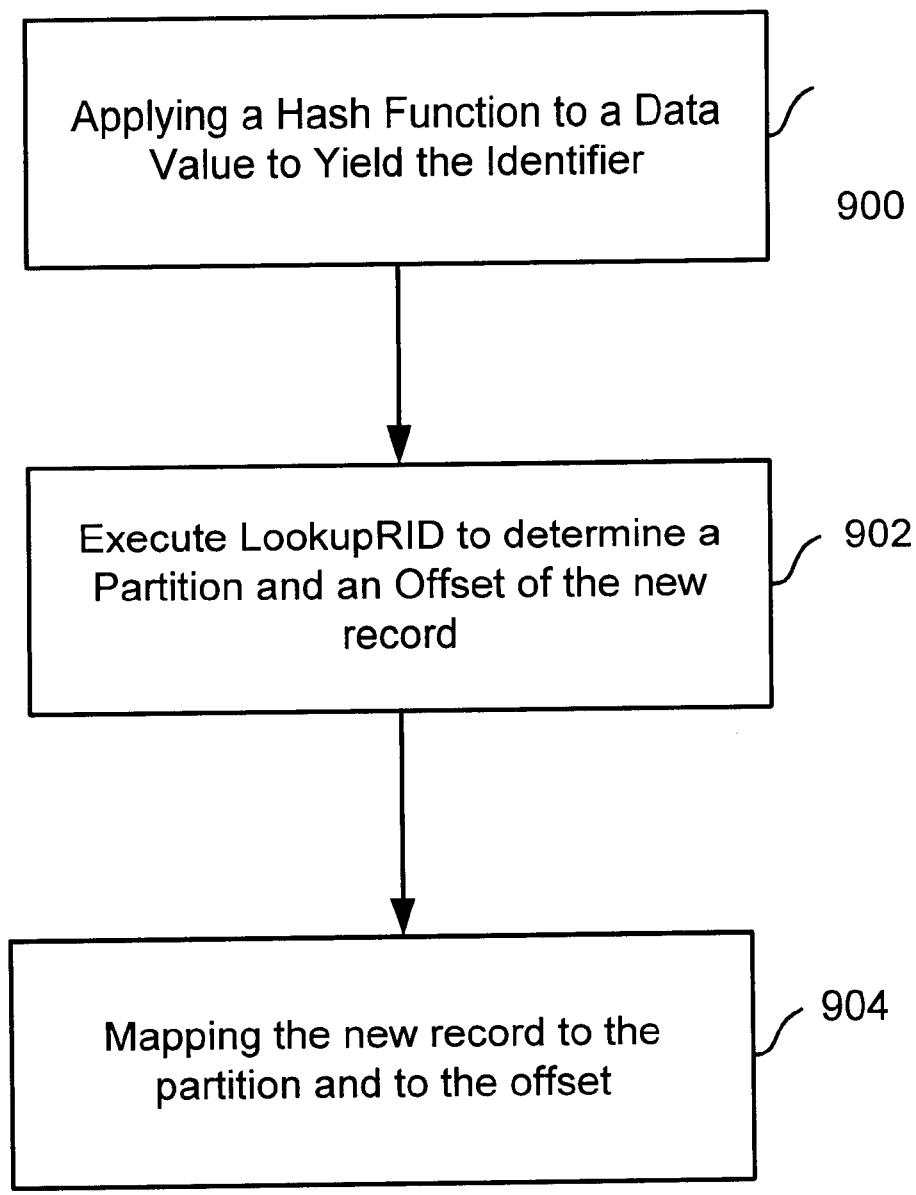
FIG. 9 is a flowchart showing a method of inserting a new record into a file that includes hash tables and uses a hashing partition method.

FIG. 9 shows the case of hash partitioning and a hashtable file structure, where the records of a table are first mapped in step 900 to partitions by applying a hash function to a specified field or set of fields. For example, in a customer table a customer number could be the value on which hashing is performed. Applying a hash function to a customer number yields a record identifier. In step 902, execute function "lookupRID" with the input of the identifier and total number of partitions in order to yield the partition and offset of the new record. In step 904, map the new record to the partition and offset.

While the invention has been described in conjunction with a specific embodiment, it is evident that many alternatives, modifications, and variations will be apparent to those skilled in the art in light of the foregoing description. Accordingly, it is intended to embrace all such alternatives, modifications, and variations that fall within the spirit and scope of the appended claims and equivalents.

What is claimed is:

1. A method for adding an nth partition to existing partitions of a file and balancing records among the nth partition and existing partitions, by a data processing system having a memory, comprising the steps of:

adding an nth partition to the existing partitions;

executing a function to determine a partition and an offset for each of one or more records of the existing partitions from an input of an identifier and a total number of partitions; and if the determined partition is the nth partition, moving and inserting the record into the nth partition.

2. The method of claim 1 further including the step of:

compressing the records of the existing partitions.

3. The method of claim 1, wherein if the file has a format of a sequential array of records, the executing step includes the step of:

moving and inserting each record at an nth position to the nth partition.

* * * * *